US012390780B2

(12) United States Patent
Guo et al.

(10) Patent No.: US 12,390,780 B2
(45) Date of Patent: Aug. 19, 2025

(54) MIXING DEVICE AND LIQUID MIXING METHOD

(71) Applicant: Southern University of Science and Technology, Shenzhen (CN)

(72) Inventors: Qiongyu Guo, Shenzhen (CN); Zhengchang Chen, Shenzhen (CN)

(73) Assignee: Southern University of Science and Technology, Shenzhen (CN)

( * ) Notice: Subject to any disclaimer, the term of this patent is extended or adjusted under 35 U.S.C. 154(b) by 1137 days.

(21) Appl. No.: 17/314,044

(22) Filed: May 7, 2021

(65) Prior Publication Data

US 2021/0260545 A1 Aug. 26, 2021

Related U.S. Application Data

(63) Continuation of application No. PCT/CN2020/098507, filed on Jun. 28, 2020.

(30) Foreign Application Priority Data

Jul. 24, 2019 (CN) ......................... 201910672106.9

(51) Int. Cl.
*B01F 35/71* (2022.01)
*B01F 23/41* (2022.01)
(Continued)

(52) U.S. Cl.
CPC ...... *B01F 35/717613* (2022.01); *B01F 23/41* (2022.01); *B01F 31/65* (2022.01);
(Continued)

(58) Field of Classification Search
CPC ............................................... B01F 35/717613
(Continued)

(56) References Cited

U.S. PATENT DOCUMENTS 3,035,820 A * 5/1962 Todd ................... B01F 25/4512
366/334
3,071,351 A * 1/1963 Brown .................... B01F 23/41
366/268
(Continued)

FOREIGN PATENT DOCUMENTS

CN 104888305 A 9/2015
CN 105664289 A 6/2016
(Continued)

*Primary Examiner* — David L Sorkin

(74) *Attorney, Agent, or Firm* — Fideli Law PLLC; Qiang Li

(57) ABSTRACT

The disclosure relates to a mixing device and a liquid mixing method. The mixing device comprises a first clamping assembly, a second clamping assembly and a driving assembly, the first clamping assembly is used for fixing a first container containing a first liquid, the second clamping assembly is used for fixing a second container containing a second liquid, the first container and the second container are in communication, the driving assembly drives the first liquid and the second liquid to flow back and forth between the first container and the second container to complete a predetermined degree of mixing to form a third liquid. The flow speed of the first liquid and the second liquid driven by the driving assembly is accurately controlled, so that an iodized oil emulsion with better physical and chemical characteristics is prepared, and an emulsion with better emulsifying effect and treatment effect is obtained.

13 Claims, 3 Drawing Sheets

10

(51) Int. Cl.

| | |
|---|---|
| ***B01F 31/65*** | (2022.01) |
| ***B01F 35/42*** | (2022.01) |
| *B01F 101/00* | (2022.01) |

(52) U.S. Cl.
CPC .......... *B01F 35/42* (2022.01); *B01F 23/4145* (2022.01); *B01F 2101/2202* (2022.01)

(58) Field of Classification Search
USPC ........................ 366/176.1, 176.3, 176.4, 268
See application file for complete search history.

(56) References Cited

U.S. PATENT DOCUMENTS

| | | | | |
|---|---|---|---|---|
| 4,162,129 | A * | 7/1979 | Bartholemew, Jr. .... | B01F 31/60 366/237 |
| 6,592,251 | B2 * | 7/2003 | Edwards ............ | B01F 35/7163 366/334 |
| 8,308,340 | B2 * | 11/2012 | Ferrante .................. | B01F 25/42 366/162.3 |
| 9,073,021 | B2 * | 7/2015 | Nakamura .............. | B01F 31/65 |
| 9,107,668 | B2 * | 8/2015 | Melsheimer ..... | A61B 17/12022 |
| 2002/0077589 | A1 * | 6/2002 | Tessari .............. | B01F 33/50112 604/82 |
| 2004/0167617 | A1 * | 8/2004 | Voellmicke ........... | A61F 2/4601 623/1.23 |
| 2005/0213427 | A1 * | 9/2005 | Steckle, Jr. ........... | B01F 23/235 366/268 |
| 2011/0160700 | A1 * | 6/2011 | Nakamura ................ | A61J 3/00 604/82 |

FOREIGN PATENT DOCUMENTS

| | | | |
|---|---|---|---|
| CN | 206534955 | U | 10/2017 |
| CN | 108187185 | A | 6/2018 |
| CN | 108421485 | A | 8/2018 |
| CN | 211133815 | U | 7/2020 |

* cited by examiner

MIXING DEVICE AND LIQUID MIXING METHOD

RELATED APPLICATIONS

This application is a continuation application of PCT application No. PCT/CN2020/098507, filed on Jun. 28, 2020, which claims priority to Chinese Application No. 201910672106.9, filed on Jul. 24, 2019, and the content of which is incorporated herein by reference in its entirety.

TECHNICAL FIELD

The present disclosure relates to the field of medical equipment, and particularly to a mixing device and a liquid mixing method.

BACKGROUND

Transcatheter arterial chemoembolization (TACE) is the mainstay treatment for patients with Barcelona Clinic Liver Cancer (BCLC) stage B (intermediate stage). The treatment method is usually to inject a mixed emulsion of an anticancer drug and an iodized oil into tumor vessels at an appropriate rate to perform the treatment.

The iodized oil emulsion needs to be freshly prepared. During an operation, the iodized oil and an aqueous solution of an anticancer drug or an iodine-containing contrast agent are fully mixed and emulsified. The conventional preparation method has the problem of a poor emulsification effect, thus affecting the treatment effect.

In order to solve the aforementioned problem of poor emulsification effect, a mixing device and a liquid mixing method are needed.

SUMMARY

The technical scheme of the application aims to solve the problem of poor emulsification effect. Therefore, it is necessary to provide a mixing device and a liquid mixing method. The mixing device has good emulsification effect and may be used for surgical treatment.

According to a first aspect of the present disclosure, a mixing device includes a first clamping assembly configured to fix a first container to contain a first liquid; a second clamping assembly configured to fix a second container to contain a second liquid; and a driving assembly. When the mixing device is in operation, the first container is in communication with the second container, relative positions of the first clamping assembly, the second clamping assembly and the driving assembly are fixed, and the driving assembly drives the first liquid and the second liquid to flow back and forth between the first container and the second container to complete a predetermined degree of mixing so as to form a third liquid.

According to a second aspect of the present application, a liquid mixing method includes filling a first container with a first liquid; filling a second container with a second liquid, the first container being in communication with the second container; and driving, by a driving assembly of a mixing device, the first liquid and the second liquid to flow back and forth between the first container and the second container to complete a predetermined degree of mixing to form a third liquid.

According to the above technical scheme, the mixing device fixes the first container containing the first liquid on the first clamping assembly and fixes the second container containing the second liquid on the second clamping assembly; the mixing device also makes the first container in communication with the second container, and drives the first piston of the first container to reciprocate in the first tubular cavity through the driving assembly, thereby driving the first liquid and the second liquid to reciprocate in the first container and the second container, thereby mixing the first liquid and the second liquid.

Other functions of this application will be partially listed in the following description. From the description, the following figures and examples will be apparent to those of ordinary skill in the art. The inventive aspects of this application may be fully explained by practicing or using the methods, devices and combinations described in the following detailed examples.

BRIEF DESCRIPTION OF THE DRAWINGS

In order to explain the technical scheme in the embodiment of the application more clearly, the following will briefly introduce the drawings needed in the embodiment description. Obviously, the drawings in the following description are only some embodiments of the application. For those skilled in the art, other drawings may be obtained according to these drawings without creative labor.

DETAILED DESCRIPTION

Figure 1:
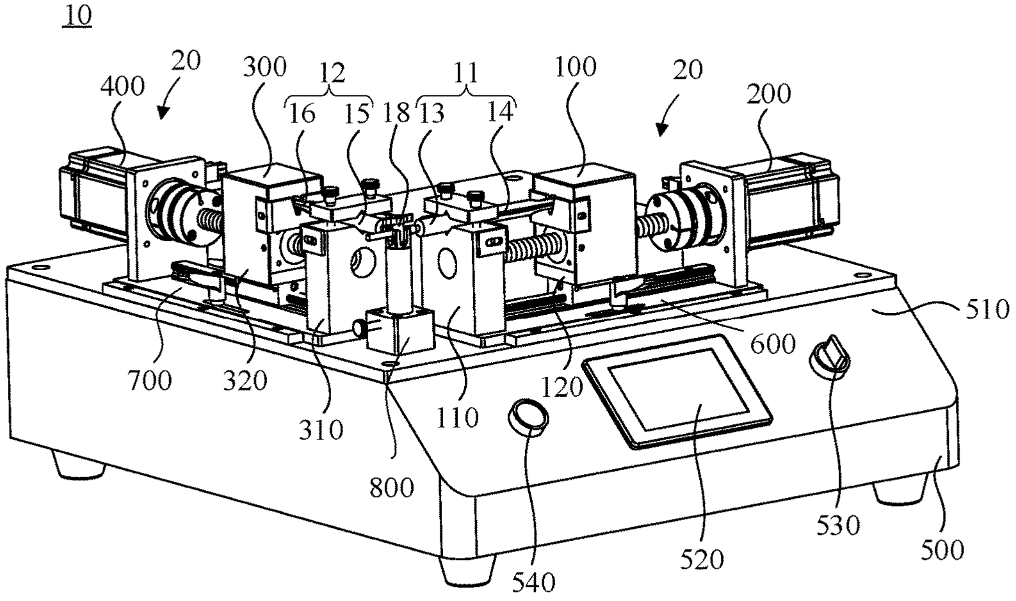
FIG. 1 shows a schematic structural view of a mixing device provided according to some embodiments of the present application.

In order to understanding the present disclosure, the present disclosure will be described more fully below with reference to the relevant drawings. A preferred embodiment of the present disclosure is shown in the drawings. However, the present disclosure may be implemented in many different forms and is not limited to the embodiments described herein. On the contrary, these embodiments are provided for a more thorough and complete understanding of the present disclosure.

It should be noted that when an element is referred to as “fixed” to another element, it may be directly on the other element or there may also be an intermediate element. When an element is considered to be “connected” to another element, it may be directly connected to the other element or there may be intermediate elements at the same time. The terms “vertical”, “horizontal”, “left”, “right” and similar expressions used herein are for illustration purposes only and are not meant to be the only embodiment.

Unless otherwise defined, all technical and scientific terms used herein have the same meaning as commonly understood by those skilled in the art of the present disclosure. The terminology used in the description of the present disclosure herein is for the purpose of describing specific embodiments only and is not intended to limit the present disclosure. As used herein, the term “and/or” includes any and all combinations of one or more related listed items.

FIG. 1 shows a schematic structural view of a mixing device 10 provided according to some embodiments of the present application. Referring to FIG. 1, the mixing device 10 is used to fully mix the first fluid and the second fluid. The first fluid and the second fluid may be any gas that needs to be mixed. The first fluid and the second fluid may also be a first liquid and a second liquid, respectively. For convenience of explanation, the present disclosure will be described in the following description by taking liquid as an example.

The first liquid and the second liquid may be any liquid that needs to be mixed. For example, the first liquid may be a water-based liquid and the second liquid may be an oil-based liquid; or the first liquid may be an oil-based liquid and the second liquid may be a water-based liquid. Of course, both the first liquid and the second liquid may be water-based liquids, and both the first liquid and the second liquid may be oil-based liquids. For convenience of description, the mixing device 10 is used to mix an iodized oil, a chemotherapy drug aqueous liquid or an iodine-containing contrast agent to prepare an iodized oil emulsion, taking the formation of an emulsion that meets the requirements as an example for detailed description. Referring to FIG. 1, the mixing device 10 may include a first clamping assembly 100, a second clamping assembly 300, and a driving assembly 20. In some embodiments, the mixing device 10 may further include a control assembly 500. In some embodiments, the mixing device 10 may further include a third clamping assembly 800 and a machine table 510. In some embodiments, the mixing device 10 may further include a first adjusting assembly 600 and a second adjusting assembly 700.

The first clamping assembly 100 may be used to fix the first container 11. The second clamping assembly 300 may be used to fix the second container 12. The first container 11 may be used to contain the first liquid, and the second container 12 may be used to contain the second liquid. When the mixing device 10 is in operation, the relative positions of the first clamping assembly 100, the second clamping assembly 300 and the driving assembly 20 are fixed, and the first container 11 may be in communication with the second container 12. The driving assembly 20 may drive the first liquid and the second liquid to flow back and forth between the first container 11 and the second container 12 to complete a predetermined degree of mixing to form a third liquid. The driving assembly 20 may be connected to the first container 11, the second container 12, or the first container 11 and the second container 12 simultaneously to drive the first liquid and the second liquid to flow back and forth between the first container 11 and the second container 12. The driving assembly 20 and the first container 11 or the second container 12 may be directly connected, or may be indirectly connected through other connecting elements, or may be contactlessly connected by a magnetic field, etc.

The first container 11 may include a first tubular cavity 13 and a first piston rod 14. The first piston rod 14 may be located in the first tubular cavity 13 and have an interference fit with the first tubular cavity 13. The first piston rod 14 may move relative to the first tubular cavity 13, and the first liquid may be contained in the cavity formed by the first piston rod 14 and the first tubular cavity 13. For example, the first container 11 may be a syringe.

The second container 12 may include a second tubular cavity 15 and a second piston rod 16. The second piston rod 16 may be located in the second tubular cavity 15 and have an interference fit with the second tubular cavity 15. The second piston rod 16 may move relative to the second tubular cavity 15, and the second liquid may be contained in the cavity formed by the second piston rod 16 and the second tubular cavity 15. For example, the second container 12 may be a syringe.

Of course, the second container 12 may not include the second piston 16 but may be a container with an elastic outer wall, such as a rubber bag. In this way, when a liquid flows into the second container 12, the outer wall of the second container 12 may automatically change its volume through elastic deformation to contain the liquid. When the liquid flows out of the second container 12, the outer wall of the second container 12 may extrude the liquid through elasticity (i.e., self-drive to discharge the liquid out of the second container 12).

As mentioned above, when the mixing device 10 is in operation, the first container 11 may be in communication with the second container 12. The first container 11 may be in direct communication with the second container 12, for example, the first container 11 and the second container 12 may be connected through a hose, or may be connected through a connector. For example, the connector may be a mixing bin 18. The mixing bin 18 may include a first opening and a second opening. The first opening may be connected with the first tubular cavity 13. The second opening may be connected with the second tubular cavity 15. The mixing bin 18 may provide a certain space while playing a connecting role, so that the liquid in the first container 11 and the second container 12 may be fully mixed. For example, the mixing bin 18 may be a three-way valve.

When the mixing device 10 is working, the driving assembly 20 may be connected with the first piston rod 14 to drive the first piston rod 14 to reciprocate in the first tubular cavity 13, or may be connected with the second piston rod 16 to drive the second piston rod 16 to reciprocate in the second tubular cavity 15, so that the first liquid and the second liquid flow in the first container 11 and the second container 12 to fully mix the first liquid and the second liquid. Specifically, the driving assembly 20 may include a first driving assembly 200 connected to the first piston rod 14. The driving assembly 20 may include a second driving assembly 400 connected to the second piston rod 16. The driving assembly 20 may include the first driving assembly 200 alone, the second driving assembly 400 alone, or both the first driving assembly 200 and the second driving assembly 400.

Figure 2:
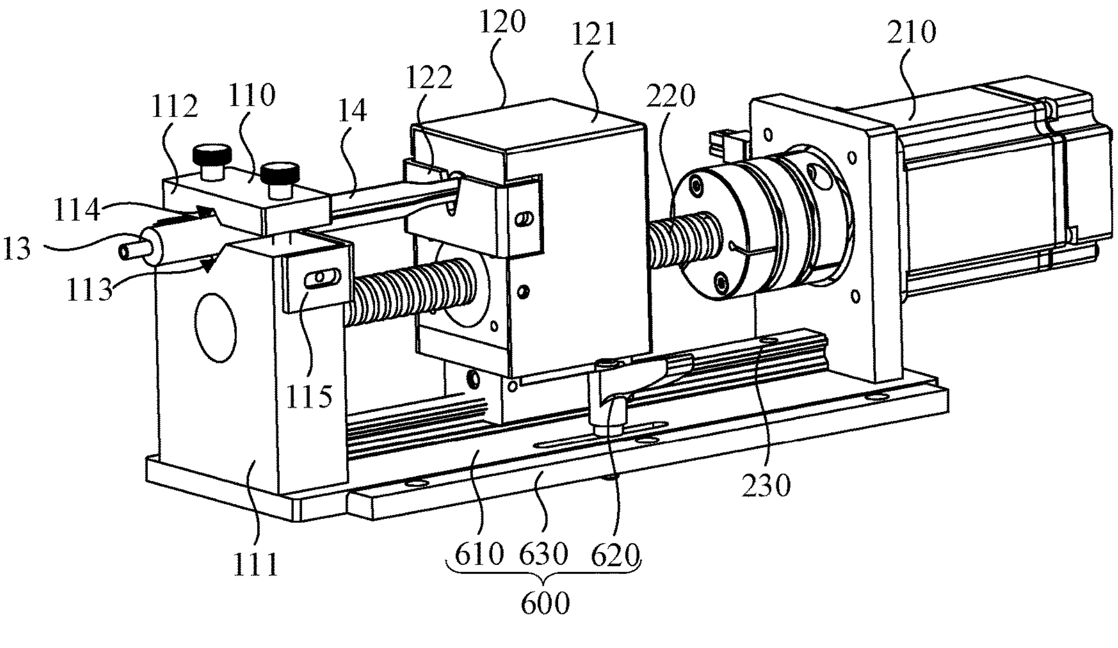
FIG. 2 shows a schematic structural view of a first clamping assembly in a mixing device according to some embodiments of the present application.

FIG. 2 shows a schematic structural view of a first clamping assembly 100 in a mixing device 10 according to some embodiments of the present application. Referring to FIG. 2, the first clamping assembly 100 may include a first fixing assembly 110 and may include a first moving assembly 120.

The first fixing assembly 110 may be used to fix the first tubular cavity 13 in the first container 11. As shown in FIG. 2, in some embodiments, the first fixing assembly 110 may include a first fixing block 111, a first pressing block 112, and a first auxiliary pressing plate 115. The first tubular cavity 13 is set between the first fixing block 111 and the first pressing block 112. Specifically, the first fixing block 111 is provided with a first mounting groove 113. The first pressing block 112 is mounted at one end of the first fixing block 111 provided with a first mounting groove 113. The first pressing block 112 is provided with a first accommodating groove 114. The first mounting groove 113 and the first accommodating groove 114 enclose a first accommodating cavity (not shown in FIG. 2) for accommodating the first tubular cavity 13. Specifically, the first pressing block 112 is mounted on the end surface of the first fixing block 111 by screws, and the height of the first pressing block 112 may be adjusted by rotating the screws, so as to adapt to the first containers 11 of different sizes. When the first container 11 is a syringe, one end of the first tubular cavity 13 near the first piston rod 14 may be provided with a hem. The first auxiliary pressing plate 115 may be installed on one side of the first fixing block 111 close to the first piston rod 14 by screws, and the first auxiliary pressing plate 115 and the first fixing block 111 cooperate to clamp one end of the first tubular cavity 13, clamping the folded edge of the first tubular cavity 13 between the first auxiliary pressing plate 115 and the first fixing block 111, thereby further improving the connection stability of the first container 11.

As previously mentioned, the driving assembly 20 may be connected to the first piston rod 14. The driving assembly 20 may be directly connected with the first piston rod 14. For example, the driving assembly 20 is a linear driving mechanism such as an electric push rod or a linear module lamp. The output end of the driving assembly 20 may be directly connected with the first piston rod 14 to drive the first piston rod 14 to reciprocate in the first tubular cavity 13. The driving assembly 20 may also be indirectly connected to the first piston rod 14 through other connecting elements. For example, the driving assembly 20 may be connected to the first piston rod 14 through the first moving assembly 120. The driving assembly 20 drives the first moving assembly 120 to move, thereby driving the first piston rod 14 to move relative to the first fixing assembly 110 and the first tubular cavity 13.

The first moving assembly 120 may be used to fix the first piston rod 14 to the first container 11. The first moving assembly 120 may include a first moving block 121 and may also include a first pressing plate 122. The first moving block 121 is connected to the first piston rod 14 and the driving assembly 20, respectively. The first pressing plate 122 is mounted on the first moving block 121. The first pressing plate 122 cooperates with the first pressing block 112 to clamp an end of the first piston rod 14 remote from the first tubular cavity 13, and clamp an end of the first piston rod 14 between the first pressing plate 122 and the first moving block 121.

Figure 3:
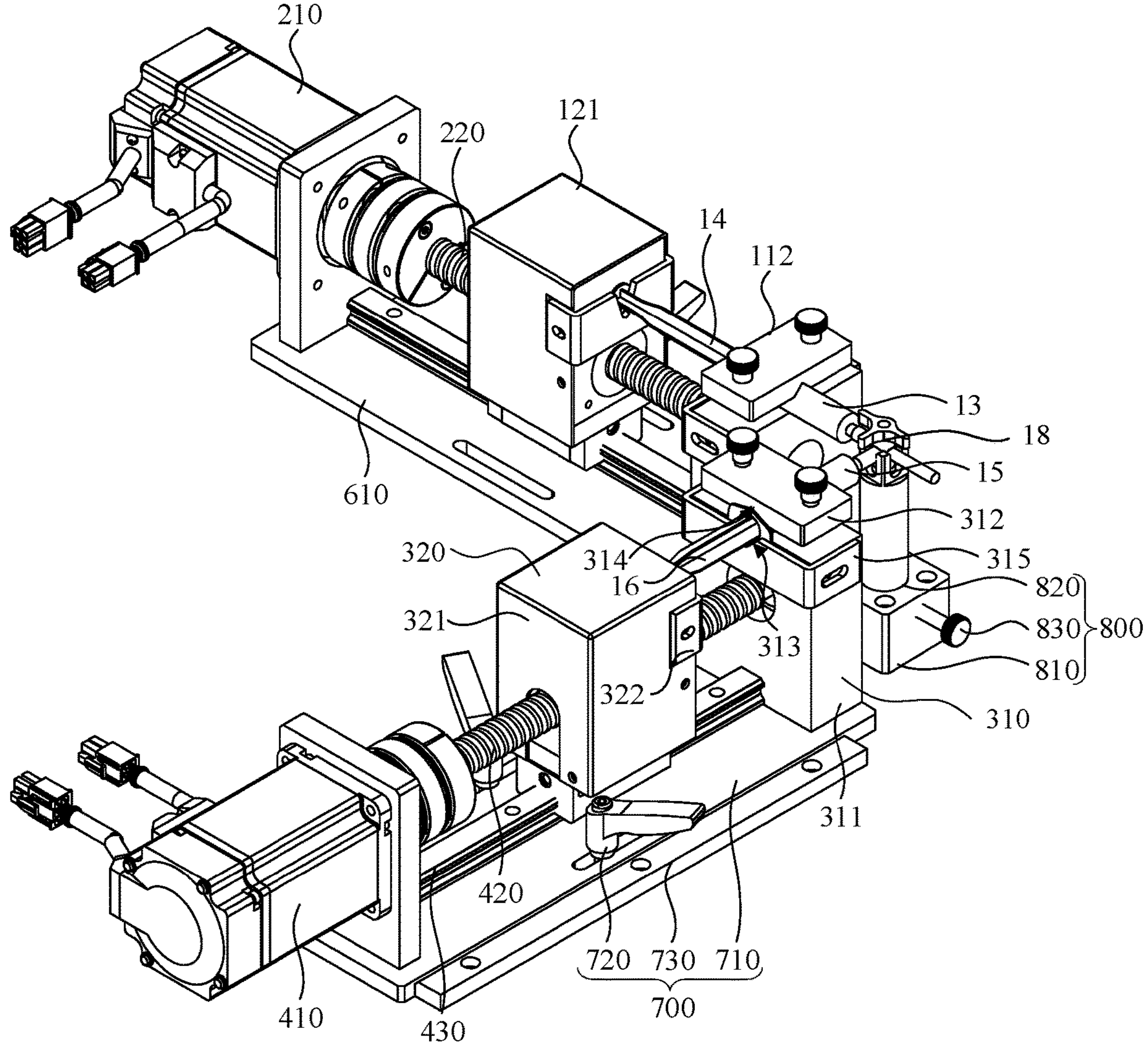
FIG. 3 shows a schematic assembly diagram of a first clamping assembly and a second clamping assembly in a mixing device according to some embodiments of the present application.

FIG. 3 shows a schematic assembly diagram of a first clamping assembly 100 and a second clamping assembly 300 in a mixing device 10 according to some embodiments of the present application. As shown in FIG. 1 and FIG. 3, the second clamping assembly 300 may include a second fixing assembly 310 and may include a second moving assembly 120.

The second fixing assembly 310 may be used to fix the second tubular cavity 15 in the second container 12. Referring to FIG. 3, in some embodiments, the second fixing assembly 310 may include a second fixing block 311, a second pressing block 312, and a second auxiliary pressing plate 315. The second tubular cavity 15 is set between the second fixing block 311 and the second pressing block 312. Specifically, the second fixing block 311 is provided with a second mounting groove 313. The second pressing block 312 is mounted at one end of the second fixing block 311 provided with the second mounting groove 313. The second pressing block 312 is provided with a second accommodating groove 314. The second mounting groove 313 and the second accommodating groove 314 enclose a second accommodating cavity (not shown in FIG. 1 and FIG. 3) for accommodating the second tubular cavity 15. Specifically, the second pressing block 312 is mounted on the end surface of the second fixing block 311 by screws, and the height of the second pressing block 312 may be adjusted by rotating the screws, so as to adapt to syringes of different sizes. When the second container 12 is a syringe, the end of the second tubular cavity 15 near the second piston rod 16 is provided with a hem. The second auxiliary pressing plate 315 may be installed on the side of the second fixing block 311 close to the second piston rod 16 by screws, and the second auxiliary pressing plate 315 and the second fixing block 311 cooperate to clamp one end of the second tubular cavity 15 and clamp the folded edge of the second tubular cavity 15 between the second auxiliary pressing plate 315 and the second fixing block 311, thereby further improving the connection stability of the second container 12.

As previously mentioned, the driving assembly 20 may be connected to the second piston rod 16. The driving assembly 20 may be directly connected with the second piston rod 16. For example, the driving assembly 20 is a linear driving assembly such as an electric push rod or a linear module lamp. The output end of the driving assembly 20 is directly connected with the second piston rod 16 to drive the second piston rod 16 to reciprocate in the second tubular cavity 15. The driving assembly 20 may also be indirectly connected to the second piston rod 16 through other connecting elements. For example, the driving assembly 20 may be connected to the second piston rod 16 through the second moving assembly 320. The driving assembly 20 drives the second moving assembly 320 to move, thereby driving the second piston rod 16 to move relative to the second fixing assembly 310 and the second tubular cavity 15.

The second moving assembly 320 may be used to fix the second piston rod 16 to the second container 12. The second moving assembly 320 may include a second moving block 321 and may also include a second pressing plate 322. The second moving block 321 is connected to the second piston rod 16 and the driving assembly 20, respectively. The second pressing plate 322 is mounted on the second moving block 321. The second pressing plate 322 cooperates with the second pressing block 312 to clamp the end of the second piston rod 16 away from the second tubular cavity 15, and clamp the end of the second piston rod 16 between the second pressing plate 322 and the second moving block 321.

As previously mentioned, the first driving assembly 200 may be connected with the first piston rod 14 through the first moving assembly 120 to drive the first moving assembly 120 to move so as to drive the first piston rod 14 to reciprocate in the first tubular cavity 13 to exchange and mix the first liquid in the first container 11 with the second liquid in the second container 12.

Referring to FIG. 2, the first driving assembly 200 may include a first driving element 210, a first connecting rod 220, and a first slide rail 230. The first connecting rod 220 penetrates the first moving block 121 and is threadedly connected with the first moving block 121. Specifically, the first connecting rod 220 may be a screw rod. The first driving element 210 may drive the first connecting rod 220 to rotate. Specifically, the first driving element 210 may be a motor. The motor may convert the voltage signal into torque and rotation speed. The motor drives the first connecting rod 220 to rotate and drives the first moving block 121 to move along the first connecting rod 220, thereby driving the first piston rod 14 connected to the first moving block 121 to reciprocate in the first tubular cavity 13 of the first container 11. The first driving element 210 may be a servo motor. The servo motor may control the first connecting rod 220 and accurately adjust the rotation speed and position accuracy, thereby accurately controlling the moving speed of the first moving block 121 and the first piston rod 14, thereby controlling the emulsification rate. In other embodiments, the first driving element 210 may also be a stepping motor with lower precision, which is suitable for emulsification processes with low speed and time precision requirements. The first slide rail 230 is set along the length direction of the first connecting rod 220. The first moving block 121 is slidably mounted on the first slide rail 230. The rotation of that first connected rod 220 will drive the first moving block 121 to slide along the first slide rail 230. The first slide rail 230 may enable the first moving block 121 to be guided during moving, and at the same time, may also improve the stability of the first moving block 121 during moving. The first container 11 is arranged parallel to the central axis of the first driving assembly 200, more specifically, the first tubular cavity 13 is arranged parallel to the central axis of the first connecting rod 220. The first moving assembly 120 drives the first moving block 121 to move in the axial direction of the first container 11, thereby driving the first piston rod 14 to reciprocate in the first tubular cavity 13, thereby exchanging and mixing the first liquid in the first container 11 with the second liquid in the second container 12.

It should be noted that when the driving assembly 20 does not include the second driving assembly 400, the first container 11 and the second container 12 is connected through the mixing bin 18 when the mixing device 10 is in operation. The rest of the outlets in the mixing bin 18 are closed. The first driving assembly 200 drives the first piston rod 14 to reciprocate in the first tubular cavity 13. Under the action of atmospheric pressure, the second piston rod 16 may be driven to reciprocate in the second tubular cavity 15 to emulsify.

As previously mentioned, the driving assembly 20 may include both the first driving assembly 200 and the second driving assembly 400. The first driving assembly 200 is connected with the first piston rod 14, the second driving assembly 400 is connected with the second piston rod 16, and the first driving assembly 200 and the second driving assembly 400 simultaneously drive the first piston rod 14 and the second piston rod 16 to alternately reciprocate, thereby mixing and emulsifying the first liquid and the second liquid.

Referring to FIG. 3, the second driving assembly 400 may include a second driving element 410, a second connecting rod 420, and a second slide rail 430. The second connecting rod 420 penetrates the second moving block 321 and is screwed with the second moving block 321. Specifically, the second connecting rod 420 may be a screw rod. The second driving element 410 may drive the second connecting rod 420 to rotate. Specifically, the second driving element 410 may be a motor. The motor may convert the voltage signal into torque and rotation speed. The motor may drive the second connecting rod 420 to rotate to drive the second moving block 321 to move along the second connecting rod 420, thereby driving the second piston rod 16 connected to the second moving block 321 to reciprocate in the second tubular cavity 15 of the second container 12. The second driving element 410 may be a servo motor. The servo motor may control the second connecting rod 420 and accurately adjust the rotation speed and position accuracy, thereby accurately controlling the moving speed of the second moving block 321 and the second piston rod 16, thereby controlling the emulsification rate. In other embodiments, the second driving element 410 may also be a stepping motor with lower precision, which is suitable for emulsification processes with low speed and time precision requirements. The second slide rail 430 is arranged along the length direction of the second connecting rod 420. The second moving block 321 is slidably mounted on the second slide rail 430. The rotation of the second connecting rod 420 will drive the second moving block 321 to slide along the second slide rail 430. The second slide rail 430 may enable the second moving block 321 to be guided during moving, and at the same time, may also improve the stability of the second moving block 321 during moving. The second container 12 is arranged parallel to the central axis of the second driving assembly 400, and more specifically, the second tubular cavity 15 is arranged parallel to the central axis of the second connecting rod 420. The second moving assembly 320 drives the second moving block 321 to move in the axial direction of the second container 12, thereby driving the second piston rod 16 to reciprocate in the second tubular cavity 15, thereby exchanging and mixing the second liquid in the second container 12 with the first liquid in the first container 11.

Referring to FIG. 1 and FIG. 2, in one embodiment, the mixing device 10 may further include a first adjusting assembly 600. The first adjusting assembly 600 may include a first bottom plate 610, a first handle 620, and a first guide plate 630. The first bottom plate 610 is the mounting base of the first clamping assembly 100. The first clamping assembly 100 and the first driving assembly 200 are both mounted on the first bottom plate 610. Specifically, the first fixing block 111, the first slide rail 230, and the first driving element 210 are all mounted on the first bottom plate 610. It should be noted that the first bottom plate 610 is installed on the machine table 510, which will be described in detail later. The first bottom plate 610 is provided with a first adjusting groove arranged along the moving direction of the first piston rod 14. The first adjusting assembly 600 is installed and fixed through the first adjusting groove. The first handle 620 is installed in the first adjusting groove to lock the first bottom plate 610. Specifically, one end of the first handle 620 is connected with a fastening screw, and the fastening screw penetrates the first adjusting groove and is in threaded connection with the machine table 510. Turning the first handle 620 to adjust the rotation of the fastening screw may lock the first bottom plate 610 on the machine table 510. By rotating the first handle 620, the first bottom plate 610 may adjust the relative position with the machine table 510 within the length range of the first adjusting groove, thereby adjusting the position of the first clamping assembly 100 according to the sizes of the first container 11, the second container 12 and the mixing bin 18 and carrying out adaptive installation. Further, the first adjusting assembly 600 may further include a first guide plate 630. The first guide plate 630 is installed on the machine table 510 by screws. The first bottom plate 610 is in contact with the first guide plate 630. The first guide plate 630 may guide the first bottom plate 610. The first bottom plate 610 may move along the first guide plate 630 during sliding, thus ensuring that the movement does not deviate.

Referring to FIG. 1 and FIG. 3, in some embodiments, the mixing device 10 may further include a second adjusting assembly 700. The second adjusting assembly 700 may include a second bottom plate 710, a second handle 720 and a second guide plate 730. The second bottom plate 710 is the mounting base of the second clamping assembly 300. The second clamping assembly 300 and the second driving assembly 400 may both be mounted on the second bottom plate 710. Specifically, the second fixing block 311, the second slide rail 430, and the second driving element 410 are all mounted on the second bottom plate 710. It should be noted that the second bottom plate 710 is installed on the machine table 510, which will be described in detail later.

The second bottom plate 710 is provided with a second adjusting groove arranged along the moving direction of the second piston rod 16. The second adjusting assembly 700 is installed and fixed through the second adjusting groove. The second handle 720 is installed in the second adjusting groove to lock the second bottom plate 710. Specifically, one end of the second handle 720 is connected with a fastening screw. The fastening screw penetrates through the second adjusting groove and is in threaded connection with the machine table 510. Turning the second handle 720 to adjust the rotation of the fastening screw may lock the second bottom plate 710 on the machine table 510. By rotating the second handle 720, the second bottom plate 710 may adjust the relative position with the machine 510 within the length range of the second adjusting groove, so as to adjust the position of the second clamping assembly 300 according to the sizes of the first container 11, the second container 12 and the mixing bin 18 and carry out adaptive installation. Further, the second adjusting assembly 700 further includes a second guide plate 730, which is installed on the machine table 510 by screws, the bottom plate is in contact with the second guide plate 730, the second guide plate 730 may guide the second bottom plate 710, and the second bottom plate 710 may move along the second guide plate 730 during sliding, thus ensuring that the movement does not deviate.

As shown in FIG. 3, the mixing device 10 may further include a third clamping assembly 800. The third clamping assembly 800 may be used to fix the mixing bin 18 that provides communication between the first container 11 and the second container 12. The third clamping assembly 800 is installed between the first clamping assembly 100 and the second clamping assembly 300. The first container 11 and the second container 12 are respectively communicated with the mixing bin 18. Specifically, the first clamping assembly 100 and the third clamping assembly 800 are in the same straight line. The second clamping assembly 300 and the third clamping assembly 800 are in the same straight line. When the mixing bin 18 is a three-way valve, in order to facilitate the connection of the three-way valve with the first container 11 and the second container 12, the included angle between the extension line of the straight line where the first clamping assembly 100 is located and the extension line of the straight line where the second clamping assembly 300 is located is 90 degrees. Of course, depending on the structure of the mixing bin 18, the included angle between the extension line of the straight line where the first clamping assembly 100 is located and the extension line of the straight line where the second clamping assembly 300 is located may also be at other angles, for example, the extension line of the straight line where the first clamping assembly 100 is located and the extension line of the straight line where the second clamping assembly 300 is located are parallel, or the extension line of the straight line where the first clamping assembly 100 is located and the extension line of the straight line where the second clamping assembly 300 is located are a straight line, etc.

The third clamping assembly 800 may include a fixing base 810, a lifting rod 820, and an adjusting element 830. The fixing base 810 is provided with an accommodating cavity. The lifting rod 820 is telescopically arranged in the accommodating cavity, and may lift relative to the fixing base 810 and may be fixed relative to the fixing base 810. The end of the lifting rod 820 remote from the fixing base 810 is provided with a groove, and the groove is used for clamping the mixing bin 18. The shape of the bottom of the mixing bin 18 matches the shape of the groove. The bottom of the mixing bin 18 may be circular, and the mixing bin 18 is clamped in the groove through the circular bottom and fixed on the lifting rod 820. Of course, the bottom of the mixing bin 18 may have other shapes, such as square, etc. The adjusting element 830 penetrates the fixing base 810 into the accommodating cavity, abuts against the lifting rod 820, and locks the lifting rod 820 with the fixing base 810. Specifically, the adjusting element 830 may be a fastening screw, and adjusting the fastening screw may lock or release the lifting rod 820, thereby adjusting the height of the lifting rod 820 relative to the fixing base 810, so that the first container 11 and the second container 12 are flush (i.e., having the same height) with the height of the first clamping assembly 100 and the second clamping assembly 300, hence complete the adaptive installation.

The machine table 510 is a base on which the mixing device 10 is mounted. The first clamping assembly 100, the second clamping assembly 300, the driving assembly 20, the third clamping assembly 800, the first adjusting assembly 600, the second adjusting assembly 700, and the control assembly 500 may all be installed on the machine table 510. The first bottom plate 610 and the second bottom plate 710 are both installed on the machine table 510.

As shown in FIG. 1, the mixing device 10 may further include a control assembly 500. The control assembly 500 may be communicatively connected with (e.g., in communication with, such as electrically connected with) the driving assembly 20, and may control the speed of reciprocating motion of the first piston rod 14 in the first tubular cavity 13 and the speed of reciprocating motion of the second piston rod 16 in the second tubular cavity 15. Therefore, the pumping speed of the first container 11 and the second container 12 may be precisely controlled, so as to control the flow speed of the first liquid and the second liquid in the first container 11 and the second container 12, thereby controlling the emulsification rate and the emulsification effect, and further researching and preparing iodized oil emulsions with better physicochemical characteristics, obtaining emulsions with better emulsification effect, and improving the treatment effect. Research shows that the faster the pumping speed, the smaller the droplet size of the emulsion, and the higher the viscosity of the emulsion, the better the emulsifying effect is obtained. In addition, since the first container 11 and the second container 12 have different capacity specifications and may bear different pressures, there is a possibility of breakage of the first container 11, the second container 12, the mixing chamber 18, etc., resulting in waste of drugs, which in turn increases the risk of doctors. In this case, by adjusting the speeds of the first piston rod 14 and the second piston rod 16, the pressure applied to the first container 11, the second container 12 and the mixing bin 18 may be adjusted to prevent the first container 11, the second container 12 and the mixing bin 18 from being damaged. As shown in FIG. 1, the control assembly 500 may include an electronic control system (not shown in FIG. 1) and may also include a single chip microcomputer (not shown in FIG. 1). In some embodiments, the control assembly 500 may further include a display 520, a power switch 530, and an emergency stop switch 540.

The electric control system is installed inside the machine table 510. The electronic control system may be communicatively connected with the first driving element 210 and the second driving element 410. The electronic control system may control the speed and duration of the movement of the first moving assembly 120 driven by the first driving assembly 200, and the speed and duration of the movement of the second moving assembly 320 driven by the second driving assembly 400.

Specifically, the control assembly 500 is communicatively connected with the first driving element 210 and the second driving element 410 through the electronic control system, and may control the speed at which the first driving assembly 200 drives the first piston rod 14 to reciprocate and the speed at which the second driving assembly 400 drives the second piston rod 16 to reciprocate. When the driving speed is fixed, by controlling the duration of driving the first piston rod 14 by the first driving element 210 and the duration of driving the second piston rod 16 by the second driving element 410, the number of reciprocations of the first piston rod 14 and the second piston rod 16 may be controlled and the pumping times may be adjusted. Research shows that the pumping times have a slight influence on the droplet size of the emulsion. The more pumping times, the smaller the particle size and the greater the stability. To a certain extent, the emulsion is more fully emulsified.

The single chip microcomputer is connected with the electric control system. The single chip microcomputer may store the parameters of the electric control system, including the parameters of the moving speed of the first moving assembly 120 driven by the first driving assembly 200 and the moving speed of the second moving assembly 320 driven by the second driving assembly 400.

Referring to FIG. 1, the control assembly 500 may further include a display 520. The display 520 is installed on the machine table 510. The display 520 may be a touch screen, and a control instruction may be input through a touch operation. After the first container 11 and the second container 12 are respectively installed on the first clamping assembly 100 and the second clamping assembly 300, the first driving element 210 and the second driving element 410 respectively drive the first moving block 121 and the second moving block 321 to slide to corresponding positions, that is, installation positions, to fix the first container 11 and the second container 12. The torques of the first driving element 210 and the second driving element 410 at this time are recorded by the touch screen. The parameter information of the installation position recorded may be retained when the mixing device 10 is turned on again after shutdown, thus the mixing device 10 may be directly installed when the syringe with the same specification and liquid capacity as the previous one is used, without repeatedly adjusting the relative positions of the first moving block 121 and the second moving block 321. In addition, during pumping, the starting position and the ending position of pumping may be set according to specific configuration requirements, and the first driving element 210 and the second driving element 410 drive the first piston rod 14 and the second piston rod 16 to reach the starting position and the ending position respectively. Specifically, the pumping of the first piston rod 14 and the second piston rod 16 is performed alternately to complete the emulsification process. When emulsions with different volume proportions are prepared, different volumes of liquid will be injected into the first container 11 and the second container 12. The starting position and ending position may be changed, and the pumping configuration information may be changed. At the same time, the installation position, the starting position and the ending position may be reserved when the power is switched on after turned off, when the first container 11 and the second container 12 with the same specifications and the same liquid capacity are used as the last time, the process of repeatedly setting the motion position parameters may be avoided, repeated emulsification is realized, the work efficiency is high, and the repeatability of the emulsification effect is high.

Referring to FIG. 1, in some embodiments, the control assembly 500 may further include a power switch 530 and an emergency stop switch 540. The power switch 530 and the emergency stop switch 540 are arranged on the machine table 510. The power switch 530 may be pressed to start the mixing device 10, and the emergency stop switch 540 may be pressed at any time during an operation of the mixing device 10 to stop the emulsification process, so that the emergency treatment may be carried out when an emergency occurs.

Figure 4:
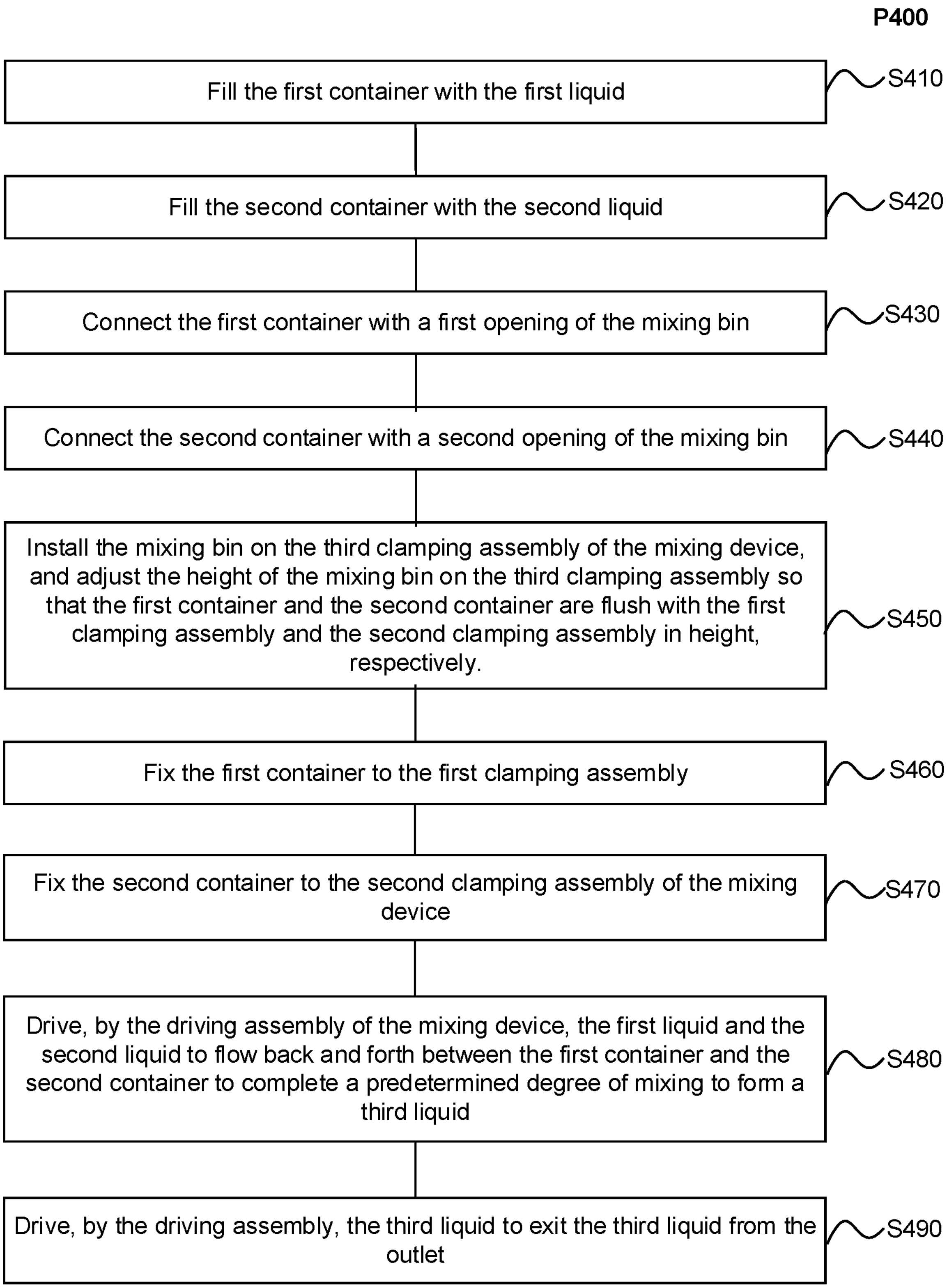
FIG. 4 shows a flow chart of a liquid mixing method according to some embodiments of the present application.

The present specification further provides a liquid mixing method suitable for the mixing device 10. FIG. 4 shows a flow chart P400 of a liquid mixing method according to some embodiment of the present application. The method comprises the following steps:

S410: Fill the first container 11 with the first liquid.

S420: Fill the second container 12 with the second liquid.

When the mixing device 10 is used for liquid mixing, the first container 11 and the second container 12 need to be respectively filled with the first liquid and the second liquid to be configured. The first container 11 and the second container 12 are in communication. As mentioned above, the first container 11 and the second container 12 may be connected directly, for example, through a hose, or through a connector such as a mixing bin 18. The mixing bin 18 is between the first container 11 and the second container 12. When the mixing bin 18 is used for communication, the first container 11 and the second container 12 need to be respectively in communication with the mixing bin 18. The method P400 may further include:

S430: Connect the first container 11 with a first opening of the mixing bin 18.

S440: Connect the second container 12 with a second opening of the mixing bin 18.

If the mixing bin 18 further includes other openings, the other openings need to be closed. For example, a three-way valve includes three openings, and the third opening of the three-way valve needs to be closed.

In order to make the mixing device 10 work better, the first container 11, the second container 12 and the mixing bin 18 need to be fixed. Therefore, the method P400 may further include:

S450: Install the mixing bin 18 on the third clamping assembly 800 of the mixing device 10, and adjust the height of the mixing bin 18 on the third clamping assembly 800 so that the first container 11 and the second container 12 are flush with the first clamping assembly 100 and the second clamping assembly 300 in height, respectively.

After the first container 11 and the second container 12 are connected to the mixing bin 18, the first container 11, the second container 12, and the mixing bin 18 need to be mounted to the mixing device 10 for liquid mixing. Specifically, the mixing bin 18 needs to be installed on the third clamping assembly 800 first. Step S430 specifically includes: installing the mixing bin 18 on the lifting rod 820; the height of the lifting rod 820 is adjusted by operating the adjusting element 830 so that the first container 11 and the second container 12 are flush with the first clamping assembly 100 and the second clamping assembly 300, so that the first container 11 and the second container 12 may be installed on the first clamping assembly 100 and the second clamping assembly 300.

S460: Fix the first container 11 to the first clamping assembly 100.

Step S460 may include: adjusting the position of the first clamping assembly 100 relative to the mixing bin 18 so that the first container 11 can be mounted on the first clamping assembly 100 and fixing the first clamping assembly 100; and fixing the first container 11 to the first clamping assembly 100. Specifically, the first adjusting assembly 600 may be operated to change the distance of the first bottom plate 610 relative to the mixing bin 18 so that the first container 11 can be mounted to the first fixing assembly 110; after the position of the first bottom plate 610 is adjusted, the first bottom plate 610 and the machine 510 are fixed to fix the first clamping assembly 100 to the machine table 510; then, the first tubular cavity 13 of the first container 11 is fixed to the first fixing assembly 110, and the first piston rod 14 is fixed to the first moving assembly 120.

S470: Fix the second container 12 to the second clamping assembly 300 of the mixing device 10.

Step S470 may include: adjusting the position of the second clamping assembly 300 relative to the mixing bin 18 so that the second container 12 can be mounted on the second clamping assembly 300 and fixing the second clamping assembly 300; and fixing the second container 12 to the second clamping assembly 300. Specifically, the second adjusting assembly 700 may be operated to change the distance of the second bottom plate 710 relative to the mixing bin 18 so that the second container 12 can be mounted to the second fixing assembly 310; after the position of the second bottom plate 710 is adjusted, the second bottom plate 710 and the machine 510 are fixed to fix the second clamping assembly 300 to the machine 510; then, the second tubular cavity 15 of the second container 12 is fixed to the second fixing assembly 310, and the second piston rod 16 is fixed to the second moving assembly 320.

In clinical practice, different volume proportions of iodized oil, chemotherapeutic drug aqueous liquid or iodine-containing contrast agent need to be selected for preparing the iodized oil emulsion. In the preparing process, syringes with different volume specifications need to be selected for repeated suction and pumping. As the diameters and lengths of syringes with different specifications are different, the syringes with different diameters and lengths may be installed and fixed by the third clamping assembly 800, the first adjusting assembly 600 and the second adjusting assembly 700. Thus, the liquid in the first tubular cavity 13 and the liquid in the second tubular cavity 15 are uniformly mixed.

S480: the driving assembly 20 of the mixing device 10 drives the first liquid and the second liquid to flow back and forth between the first container 11 and the second container 12 to complete a predetermined degree of mixing to form a third liquid.

Specifically, the first liquid and the second liquid may flow back and forth between the first container 11 and the second container 12 through the mixing bin 18. As mentioned above, the driving assembly 20 may be connected to the first piston rod 14, and step S480 may include: the driving assembly 20 driving the first piston rod 14 to reciprocate in the first tubular cavity 13 to drive the first liquid and the second liquid to reciprocate between the first container 11 and the second container 12. As mentioned above, the driving assembly 20 may be connected to the second piston rod 16, and step S480 may further include: the driving assembly 20 driving the second piston rod 16 to reciprocate in the second tubular cavity 15 to drive the first liquid and the second liquid to reciprocate between the first container 11 and the second container 12.

After mixing, the third liquid may be taken out of the mixing bin 18. The mixing bin 18 may also include an outlet through which the third liquid may be discharged. For example, the opening may be provided without cutting off the communication between the first container and the second container, and then the driving assembly 20 may drive the third liquid to flow out of the third opening. Therefore, the method P400 may further include:

S490: the driving assembly 20 drives the third liquid to exit the third liquid from the outlet.

Of course, the third liquid may be discharged from the first opening and/or the second opening of the mixing bin 18. For example, the driving assembly 20 may drive the third liquid to flow into the first container; then the mixing bin 18 is disconnected from the second container; then the driving assembly 20 may drive the third liquid to flow out of the first container and discharge the third liquid from the first opening of the mixing bin 18. Of course, the third liquid may also be drawn to the first container 11 or the second container 12 by the driving assembly 20, and then discharged from the first container 11 or the second container 12.

In summary, according to the mixing device 10 and the liquid mixing method provided in this specification, the first container 11 containing the first liquid and the second container 12 containing the second liquid are fixed through the first clamping assembly 100 and the second clamping assembly 300, the first container 11 is communicated to the second container 12; the first piston rod 14 of the first container 11 and the second piston rod 16 of the second container 12 are driven by the driving assembly 20, so that the first liquid and the second liquid flow back and forth between the first container 11 and the second container 12, thereby uniformly mixing the first liquid and the second liquid; the speed and duration of the reciprocating motion of the first piston rod 14 and the second piston rod 16 are controlled by the control assembly 500, thereby controlling the emulsifying rate and emulsifying effect when the first liquid and the second liquid are mixed. The mixing device 10 and the liquid mixing method can fully and uniformly mix the first liquid and the second liquid, thereby obtaining an emulsion with better emulsifying effect and improving the treatment effect.

The technical features of the above embodiments can be combined arbitrarily. For the sake of brevity, not all possible combinations of the technical features of the above embodiments have been described. However, as long as there is no contradiction in the combination of these technical features, it should be considered as the scope recorded in this specification.

The above examples represent only a few embodiments of the present invention, and their descriptions are more specific and detailed, but they should not be construed as limiting the scope of the invention. It should be pointed out that for those skilled in the art, several modifications and improvements can be made without departing from the concept of the present invention, which are all within the scope of protection of the present invention. Therefore, the scope of protection of the present invention shall be subject to the appended claims.

What is claimed is:

1. A mixing device, comprising:

a first clamping assembly, including a first fixing assembly configured to fix a first tubular cavity of a first container, which is for containing a first liquid;

a second clamping assembly, including a second fixing assembly configured to fix a second tubular cavity of a second container, which is used for containing a second liquid, wherein upon fixing the first container with the first clamping assembly and fixing the second container with the second clamping assembly, the first container and the second container are in an angled arrangement and in communication with each other; and a driving assembly, including:

a first driving element to connect to a first piston of the first container, wherein the first piston locates in the first tubular cavity and has an interference fit with the first tubular cavity, and a second driving element, capable of operating independently from the first driving element, to connect to a second piston of the second container, wherein the second piston locates in the second tubular cavity and has an interference fit with the second tubular cavity;

wherein, during operation, the driving assembly drives the first piston to reciprocate in the first tubular cavity and drives the second piston to reciprocate in the second tubular cavity, so as to drive the first liquid and the second liquid to flow back and forth between the first container and the second container to complete a predetermined degree of mixing, thereby forming a third liquid.

2. The mixing device of claim 1, further comprising:

a control assembly to control a speed at which the driving assembly drives the first liquid and the second liquid to flow; and a machine table, wherein the first clamping assembly, the second clamping assembly, the driving assembly and the control assembly are mounted on the machine table.

3. The mixing device of claim 1, wherein the first fixing assembly includes:

a first fixing block provided with a first mounting groove; and a first pressing block at one end of the first fixing block provided with the first mounting groove, the first pressing block being provided with a first accommodating groove, wherein, the first mounting groove and the first accommodating groove enclose a first accommodating cavity for accommodating the first tubular cavity.

4. The mixing device of claim 1, wherein when the mixing device is in operation, the first tubular cavity is in communication with the second tubular cavity, and the driving assembly is connected with the first piston to drive the first piston to reciprocate in the first tubular cavity so that the first liquid and the second liquid flow back and forth between the first container and the second container.

5. The mixing device of claim 4, wherein the first clamping assembly further includes a first moving assembly configured to fix the first piston, and the driving assembly is connected with the first piston through the first moving assembly.

6. The mixing device of claim 5, wherein the first moving assembly includes:

a first moving block, having ends being respectively connected to the first piston and the driving assembly; and a first pressing plate installed on one end of the first moving block connected with the first piston, and the first pressing plate being configured to cooperate with the first pressing block to clamp one end of the first piston remote from the first tubular cavity.

7. The mixing device of claim 6, wherein the driving assembly includes:

a first connecting rod which penetrates the first moving block and is in threaded connection with the first moving block; and a first driving element which drives the first connecting rod to rotate.

8. The mixing device of claim 7, wherein the driving assembly further includes:

a first slide rail arranged along a length direction of the first connecting rod, wherein, the first moving block is slidably mounted on the first slide rail, and the first connecting rod drives the first moving block to slide along the first slide rail through rotation.

9. The mixing device of claim 4, wherein when the mixing device is in operation, the driving assembly is connected with the second piston to drive the second piston to reciprocate in the second tubular cavity so that the first liquid and the second liquid flow back and forth between the first container and the second container.

10. The mixing device of claim 9, wherein the second clamping assembly further includes a second moving assembly configured to fix the second piston, and the driving assembly is connected with the second piston through the second moving assembly.

11. The mixing device of claim 1, further comprising a first adjusting assembly including:

a first bottom plate, the first clamping assembly being installed on the first bottom plate, and the first bottom plate being provided with a first adjusting groove, wherein, the first clamping assembly performs position adjustment through the first adjusting groove.

12. The mixing device of claim 1, further comprising a second adjusting assembly including:

a second bottom plate, the second clamping assembly is installed on the second bottom plate, the second bottom plate is provided with a second adjusting groove, wherein, the second clamping assembly adjusts the position through the second adjusting groove.

13. The mixing device of claim 1, further comprising:

a third clamping assembly installed between the first clamping assembly and the second clamping assembly to fix a mixing bin, wherein when the mixing device is in operation, the first container and the second container are communicated through the mixing bin.

* * * * *